US009479031B2

(12) United States Patent
Beste et al.

(10) Patent No.: US 9,479,031 B2
(45) Date of Patent: Oct. 25, 2016

(54) TUBULAR LINEAR MOTOR WITH MAGNETOSTRICTIVE SENSOR

(71) Applicant: MTS Sensor Technologie GmbH & Co. KG, Lüdenscheid (DE)

(72) Inventors: Andre Beste, Radevormwald (DE); Manfred Sapp, Kirchhundem (DE); Ingo Walter, Siegen (DE)

(73) Assignee: MTS SENSOR TECHNOLOGIE GMBH & CO. KG, Ludenscheid (DE)

( * ) Notice: Subject to any disclaimer, the term of this patent is extended or adjusted under 35 U.S.C. 154(b) by 121 days.

(21) Appl. No.: 13/790,135

(22) Filed: Mar. 8, 2013

(65) Prior Publication Data
US 2014/0252889 A1    Sep. 11, 2014

(51) Int. Cl.
| | |
|---|---|
| H02K 41/02 | (2006.01) |
| H02K 11/02 | (2016.01) |
| G01D 5/48 | (2006.01) |
| H02K 41/03 | (2006.01) |
| H02K 1/27 | (2006.01) |
| H02K 1/28 | (2006.01) |

(52) U.S. Cl.
CPC ............ *H02K 11/026* (2013.01); *G01D 5/485* (2013.01); *H02K 41/031* (2013.01); *H02K 1/2733* (2013.01); *H02K 1/28* (2013.01); *H02K 11/022* (2013.01)

(58) Field of Classification Search
CPC ......... H02K 11/0015; H02K 11/0021; H02K 41/031; H02K 29/08; F04B 11/00
USPC .......................... 310/12.01–12.33, 25, 23, 30
See application file for complete search history.

(56) References Cited

U.S. PATENT DOCUMENTS

| | | | |
|---|---|---|---|
| 4,585,978 A * | 4/1986 | Hasselmark et al. | ......... 318/118 |
| 4,628,499 A | 12/1986 | Hammett | |
| 5,313,160 A | 5/1994 | Gloden et al. | |
| 5,801,530 A | 9/1998 | Crosby et al. | |
| 6,203,288 B1 | 3/2001 | Kottke | |
| 6,283,720 B1 | 9/2001 | Kottke | |
| 6,310,472 B1 | 10/2001 | Chass | |
| 6,331,772 B1 | 12/2001 | Windte et al. | |
| 6,506,030 B1 | 1/2003 | Kottke | |
| 6,690,160 B2 | 2/2004 | Gray et al. | |
| 7,034,527 B2 | 4/2006 | Low et al. | |
| 7,755,350 B2 | 7/2010 | Arns, Jr. et al. | |

(Continued)

FOREIGN PATENT DOCUMENTS

| | | |
|---|---|---|
| EP | 1018601 A2 | 7/2000 |
| WO | 9315378 A1 | 8/1993 |

OTHER PUBLICATIONS

International Search Report and Written Opinion from the European Patent Office mailed Sep. 4, 2014 for corresponding International Application No. PCT/IB2014/000864, filed Mar. 6, 2014.

*Primary Examiner* — Hanh Nguyen
(74) *Attorney, Agent, or Firm* — Steven Koehler; Westman, Champlin & Koehler

(57) ABSTRACT

A motor includes a position-sensing magnetostrictive element that extends along a stator bore. A slider slides in the stator bore and includes a stack of motor magnets. The stack includes a first stack end that provides a magnetic field pattern that magnetizes a region of the magnetostrictive element. The motor includes shield elements such as a non-magnetic shield tube and a magnetic flux diverter.

14 Claims, 7 Drawing Sheets

(56) References Cited

U.S. PATENT DOCUMENTS

| | | |
|---|---|---|
| 7,812,482 B2 | 10/2010 | Aso et al. |
| 7,847,541 B1 | 12/2010 | Meisel |
| 7,999,422 B2 | 8/2011 | Dorel |
| 2002/0039060 A1* | 4/2002 | Maruyama .................. 335/220 |
| 2007/0164635 A1* | 7/2007 | Witteveen et al. ...... 310/323.01 |
| 2008/0197948 A1 | 8/2008 | Hedayat |
| 2009/0218894 A1 | 9/2009 | Aso et al. |
| 2009/0278641 A1 | 11/2009 | Hedayat |
| 2010/0097017 A1 | 4/2010 | Oteman et al. |
| 2010/0171459 A1 | 7/2010 | Aso et al. |
| 2011/0084559 A1 | 4/2011 | Finkbeiner |

* cited by examiner

TUBULAR LINEAR MOTOR WITH MAGNETOSTRICTIVE SENSOR

BACKGROUND OF THE INVENTION

The discussion below is merely provided for general background information and is not intended to be used as an aid in determining the scope of the claimed subject matter.

A measurement environment with high magnetic fields is problematic for magnetostrictive sensors. The high magnetic fields tend to introduce noise into the measurement of position using magnetostrictive sensors. High magnetic fields are present in motors, especially under high load conditions, and applications of magnetostrictive sensors in motors is difficult.

SUMMARY

This summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In the embodiments described below, a first end magnet of a stack of motor magnets provides a magnetic field pattern that intersects a magnetostrictive sensor for sensing, and also functions as a motor magnet to produce a portion of the motor force. The arrangement avoids the use of a flux diverter near the first end magnet, and also avoid the use of a separate position indicating magnet.

In the embodiments described below, a non-magnetic, electrically conductive shield tube is disposed inside a stack of motor magnets. The shield tube allows a magnetic field of the motor magnets to pass through the shield, while also shielding a magnetostrictive element from high frequency noise at motor excitation frequencies.

In the embodiments described below, a high permability end flux diverter is provided adjacent a second stack end of magnet stack. The end flux diverter prevents the second stack end from magnetizing a magnetostrictive element. In a further embodiment, an auxiliary flux diverter in the form of a ferromagnetic pusher rod is also provided.

In the embodiments described below, a position indicating circuit and a motor controller are connected to a motor in order to provide closed loop control of a motor position.

According to a first alternative aspect, a motor comprises a stator that surrounds a stator bore; a position-sensing magnetostrictive element that extends along the stator bore; and a slider that slides in the stator bore and that includes a stack of motor magnets. The slider comprises a first stack end that has no stack end flux diverter, and the first stack end provides a first stack end magnetic field pattern that magnetizes a region of the magnetostrictive element and that intersects the stator.

According to a second alternative aspect, a motor comprises a stator that surrounds a stator bore and that produces a changing stator magnetic field in a stator excitation frequency range; a position-sensing magnetostrictive element that extends along the stator bore; and a slider that slides in the stator bore and that includes a shield tube that surrounds the magnetostrictive element, and a stack of motor magnets disposed on the shield tube, the stack comprising a first stack end providing a first stack end magnetic field that magnetizes a region of the magnetostrictive element, the shield tube shielding the magnetostrictive element from the changing magnetic field in the excitation frequency range.

According to a third alternative aspect, a motor comprises a stator that surrounds a stator bore; a position-sensing magnetostrictive element that extends along the stator bore; and a slider that slides in the stator bore and that comprises a stack of motor magnets that includes a second stack end and an end flux diverter adjacent the second stack end, the end flux diverter preventing a second stack end magnetic field from magnetizing the magnetostrictive element.

In each of the first, second and third alternative aspects, the motor can be arranged so that the slider does not include a position indicating magnet, separate from the stack of motor magnets, for magnetizing the region of the magnetostrictive element In each of the first, second and third alternative aspects, the motor can be arranged so that the first stack end is positioned between a second stack end and a sonic pulse sensor that couples to the magnetostrictive element.

In each of the first, second and third alternative aspects, the motor can be arranged so that the shield tube attenuates the changing stator magnetic field inside the shield tube by at least 3 decibels in the excitation frequency range.

In each of the first, second and third alternative aspects, the motor can be arranged so that the first stack end magnetic field passes through the shield tube.

In each of the first, second and third alternative aspects, the motor can be arranged so that the shield tube comprises a non-ferromagnetic metal.

In each of the first, second and third alternative aspects, the motor can be arranged so that the shield tube comprises stainless steel.

In each of the first, second and third alternative aspects, the motor can be arranged so that the end flux diverter comprises mu metal.

In each of the first, second and third alternative aspects, the motor can be arranged so that the end flux diverter has a washer shape with a central washer opening through which the magneto strictive element passes.

In each of the first, second and third alternative aspects, the motor can be arranged so that the end flux diverter is in physical contact with a magnet at the second stack end.

In each of the first, second and third alternative aspects, the motor can be arranged to include a ferromagnetic pusher rod in contact with the end flux diverter, the ferromagnetic pusher rod functioning as a secondary flux diverter.

In each of the first, second and third alternative aspects, the motor can be arranged so that the slider comprises a shield tube that extends through the flux end diverter, and the ferromagnetic pusher rod comprises a threaded end that is threaded onto a threaded end of the shield tube.

In each of the first, second and third alternative aspects, the magnets can comprise permanent magnets.

In each of the first, second and third alternative aspects, the motor can function as a tubular linear motor to provide linear force and linear motion between the slider and the stator.

In each of the first, second and third alternative aspects, an inner stator sleeve can provide mechanical support for a coil stack and provide a sliding surface to accomodate low stiction sliding of the slider. The sliding surface can comprise PTFE plastic resin.

In each of the first, second and third alternative aspects, the stator can comprise resilient rings formed of compressible material to accomodate differing rates of thermal expansion of a coil stack and an outer stator sleeve.

In each of the first, second and third alternative aspects, the use of a stack end flux diverter and a position indicating magnet can be avoided, reducing cost and complexity of construction around the first stack end.

In each of the first, second and third alternative aspects, the magnetostrictive element can couple to transducer circuitry that provides an output that indicates a measurement of position to a motor controller that controls excitation currents to the coil stack in order to provide closed loop control of the position of the slider.

In each of the first, second and third alternative aspects, the measurement of position can be made more accurate with the use of a shield tube that provides noise immunity against the magnetic fields of the motor coil during operation.

In each of the first, second and third alternative aspects, the diversion of magnetic flux by an end flux diverter and a pusher rod helps to avoid interference with the magnetostrictive element.

In each of the first, second and third alternative aspects, a shield tube can alternatively be attached to a first stator end, thereby avoiding adding a moving mass of the shield tube to the slider.

According to one alternative, the motor can be used in conjunction with a position sensing circuit that comprises a position-indicating circuit mounted on the mounting end, the circuit including:

a transducer that transduces a sonic pulse adjacent the mounting end of the magnetostrictive element to an analog pulse; a transducer circuit that receives the analog pulse and provides a digital pulse; a measurement circuit that provides a current pulse to the magnetostrictive element and that measures a sonic delay time between the current pulse and the digital pulse; and a blanking circuit couples to the transducer circuit and that blanks a repetition of the current pulse during a blanking time interval. According to another aspect, the blanking time interval is greater than a sonic delay time interval associated with a length of the magnetostrictive element.

DETAILED DESCRIPTION

Figure 1:
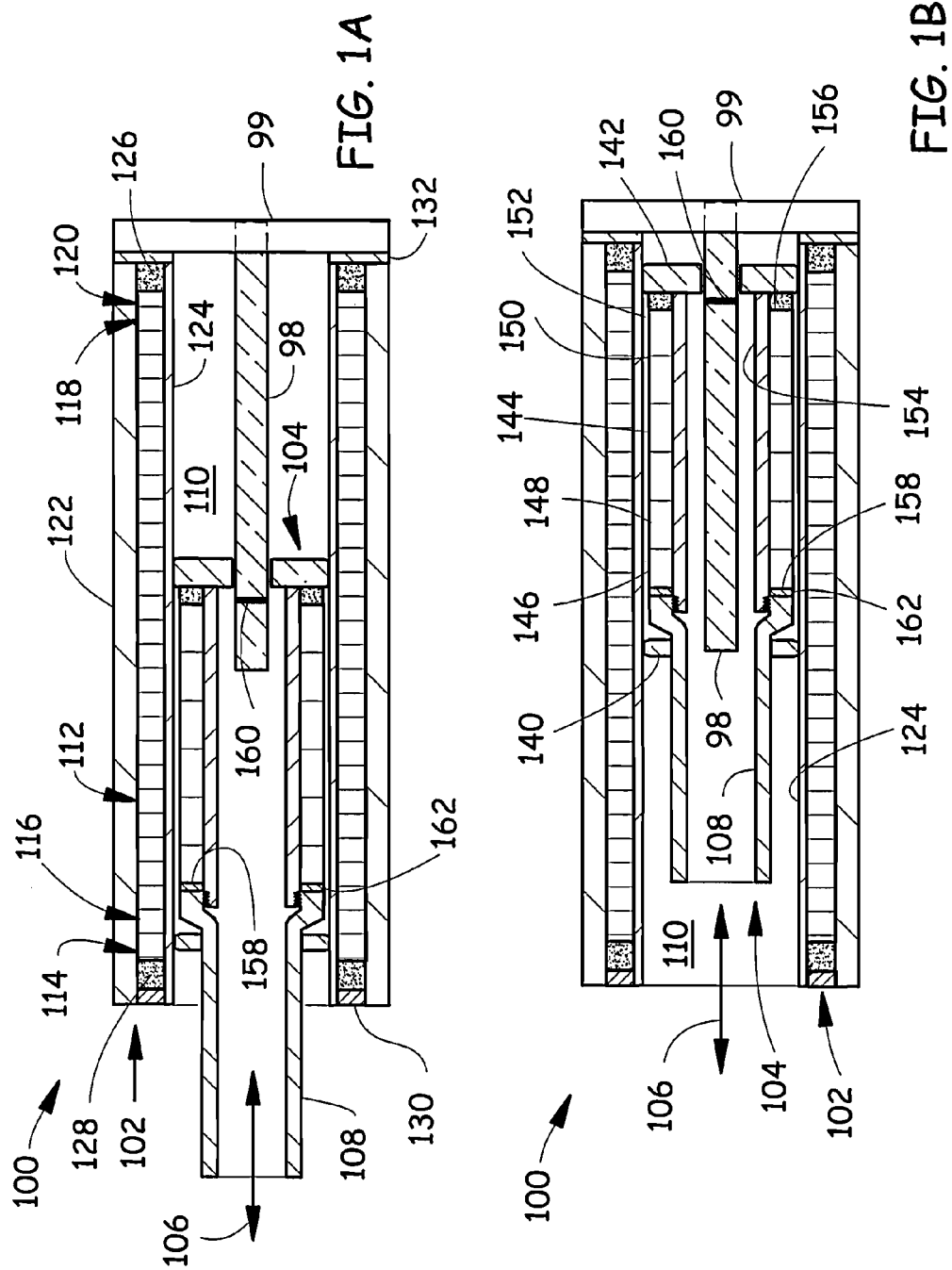
FIG. 1A illustrates a front cross-sectional view of a tubular linear motor with a slider shown in a first (more extended) position and with a shield tube attached to the slider.
FIG. 1B illustrates a front cross-sectional view of the motor in FIG. 1A with the slider shown in a second (less extended) position.

FIGS. 1A, 1B illustrate an exemplary embodiment of a tubular linear motor 100 with a magnetostrictive sensor element 98. The motor 100 comprises a stator 102 that is a portion of the motor 100 that is typically mounted to a non-moving portion of a machine (not illustrated). The motor 100 comprises a slider 104 that is a portion of the motor 100 that moves in a sliding fashion relative to the stator 102. The slider 104 slides, for example, along an axis 106 between a first (more extended) position illustrated in FIG. 1A and a second (less extended) position illustrated in FIG. 1B. The slider 104 includes a pusher rod 108 that is typically attached to a machine part (not illustrated) which is intended to be moved by the motor 100 relative to the non-moving portion of the machine. The position-sensing magnetostrictive element 98 is mounted at a first stator end 99 of the stator 102 and extends along a stator bore 110. The magnetostrictive element 98 is connectable to circuitry (such as circuitry illustrated in FIG. 6) that provides a measured position output that indicates a position of the slider 104 relative to the stator 102. The motor 100 functions as a tubular linear motor and provides linear force and relative linear motion between the slider 104 and the stator 102. The magnetostrictive element 98 provides a feedback output (as explained in more detail below in FIG. 6) that indicates the position of the slider to a motor controller that controls the motor 100.

The stator 102 surrounds the stator bore 110. The stator 102 comprises a coil stack 112 of electrical coils such as exemplary coils 114, 116, 118, 120. The coils in the coil stack 112 typically comprise toroidally-shaped coils of insulated copper wire embedded in resin. The coil stack 112 is electrically energized (as described in more detail below in connection with FIG. 6) to provide a time varying magnetic field pattern inside the stator bore 110. The stator 102 comprises an outer stator sleeve 122 that provides mechanical support for the coil stack 112, and that also provides a low reluctance magnetic enclosure for the coil stack 112. According to one aspect, the outer sleeve 122 comprises magnetically soft ferromagnetic material. The stator 102 comprises an inner stator sleeve 124 that has a tube shape. The inner stator sleeve 124 provides mechanical support for the coil stack 112 and provides a sliding surface to accommodate low stiction sliding motion of the slider 104. The inner stator sleeve 124 typically comprises PTFE plastic resin that is not magnetic.

The stator 102 comprises resilient rings 126, 128 formed of compressible material. The rings 126, 128 are axially compressible to accommodate differing rates of thermal expansion of the coil stack 112 and the outer stator sleeve 122.

The stator 102 comprises retention rings 130, 132. The retention rings 130, 132 retain the coil stack 112 in the outer stator tube 122. The retention rings 130, 132 typically comprise steel. The retention rings 130, 132 are typically welded to the outer stator sleeve 122.

Referring now to FIG. 1B, the slider 104 comprises sliding bearings 140, 142 that slidingly support the slider 104 on the inner stator sleeve 124 as the slider changes position. The slider 104 comprises a magnet stack 144 of preferably permanent magnets such as magnets 146, 148, 150, 152. According to one embodiment, the magnets in the magnet stack 144 have a generally toroidal shape. While the magnets in magnet stack 144 have a generally toroidal shape, these magnets are typically magnetized in non-toroidal patterns in order to provide a magnetic field that is external to the magnet. The slider 104 comprises a shield tube 154 that mechanically supports the magnet stack 144. The shield tube 154 is described in more detail below in connection with FIGS. 2, 3A, 3B.

The slider 104 comprises a first stack end 156 and an opposite second stack end 158. As described in more detail below in connection with FIGS. 2, 3A, 3B, the first stack end 156 has no stack end flux diverter, and the first stack end 156 provides a first stack end magnetic field pattern (illustrated by example in FIGS. 3A, 3B) that magnetizes a region 160 of the magnetostrictive element 98. The first stack end magnetic pattern (FIGS. 3A, 3B), in addition to magnetizing the region 160, also intersects the stator 102. The region 160 moves along the magnetostrictive element 98 as the slider 104 moves. The first stack end 156 does not include a position indicating magnet, separate from the stack of motor magnets, for magnetizing the region of the magnetostrictive element. The uses of a stack end flux diverter and a position indicating magnet at the first end 156 are avoided, reducing the cost and complexity of construction around the first stack end 156.

The slider 104 comprises an end flux diverter 162 adjacent the second stack end 158. The end flux diverter 162 prevents a second stack end magnetic field from magnetizing the magnetostrictive element 98. The end flux diverter 162 is described in more detail below by way of an example illustrated in FIGS. 4, 5A, 5B.

As described in more detail below in connection with an example illustrated in FIG. 6, the magnetostrictive element 98 couples to transducer circuitry that provides an output indicating a measurement of position to a motor controller that controls currents to the coil stack 112 in order to provide closed loop control of the position of the slider 104.

Figure 2:
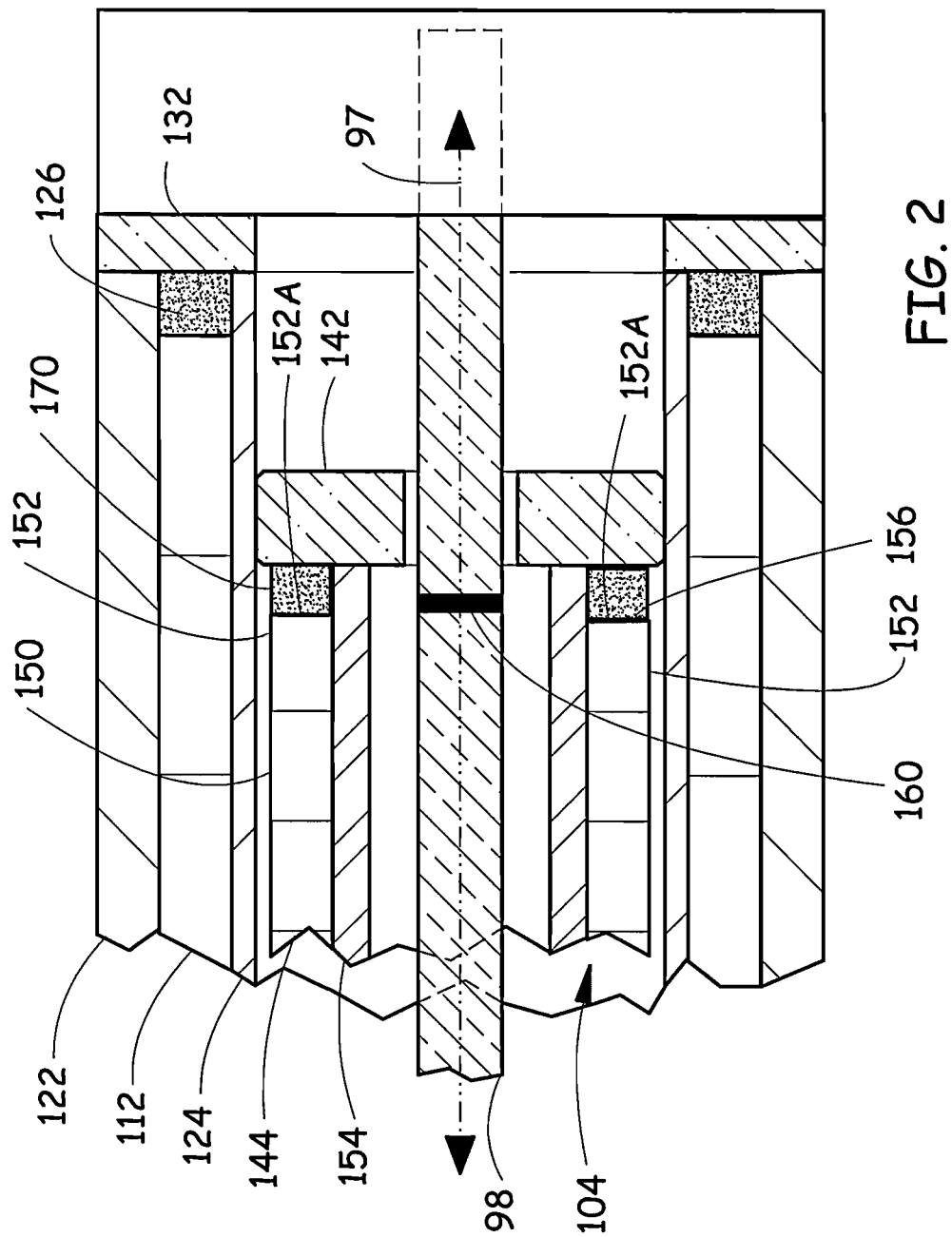
FIG. 2 illustrates an enlarged front view of the motor in FIGS. 1A, 1B around a first stack end of the slider.

FIG. 2 illustrates an enlarged view around the first stack end 156 of the slider 104 of FIGS. 1A, 1B. The first stack end 156 includes an end magnet 152. End magnet 152 is a permanent magnet and has a generally toroidal shape. The end magnet 152 is magnetized to produce a magnetic field (also called a magnetic field pattern) that is external to the end magnet 152. The end magnet 152 has a magnet end 152A that produces an external magnetic field that is explained in more detail below by way of an example illustrated in FIGS. 3A, 3B. The end magnet 152 is part of the slider 104 and moves when the slider 104 moves. The end magnet 152 produces a magnetic field that is transverse to a major axis 97 of the magnetostrictive element 98. The end magnet 152 transversely magnetizes a region 160 of the magnetostrictive element 98. The region 160 moves to different positions along a length of the magnetostrictive element 98 as the slider 104 moves. As described in more detail below in an example in FIG. 6, the position of the region 160 is sensed by a circuit that provides position feedback to a motor controller. The shield tube 154 is formed of a non-magnetic material which permits a magnetic field from the end magnet 152 to pass through the shield tube 154 in order to magnetize the region 160. According to one aspect, the shield tube 154 is formed of non-ferromagnetic (or very weakly ferromagnetic) stainless steel. The shield tube 154 and the end magnet 152 are stationary relative to one another, and the frequency of the magnetic field of the permanent end magnet 152 relative to the shield tube 154 is essentially zero. The magnetic field has a near-zero frequency range and can pass through the non-magnetic shield tube 154 with little or no attenuation. The first stack end 156 has no stack end flux diverter. The first stack end 156 provides a first stack end magnetic field pattern that magnetizes the region 160 without the need for a separate position indicating magnet. The end magnet 152 provides a magnetic field pattern that performs a first function of interacting with the stator coil stack 112 to provide motor force, and that also performs a second function of magnetizing the region 160.

Figure 3B:
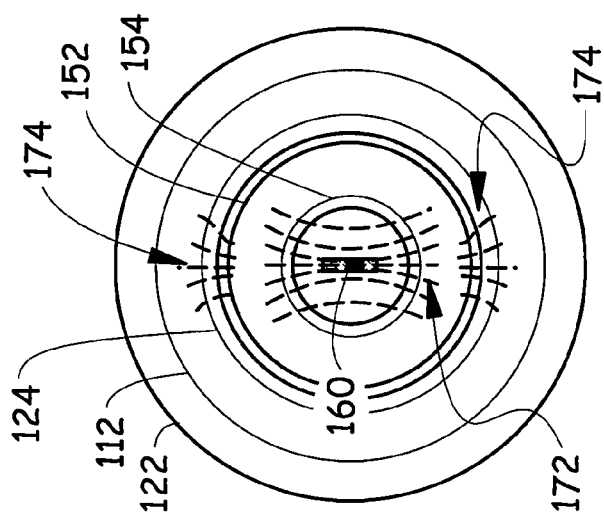
FIG. 3B illustrates a side cross-sectional view of an external magnetic field pattern produced by an end magnet of the slider in FIGS. 1A, 1B.
Figure 3A:
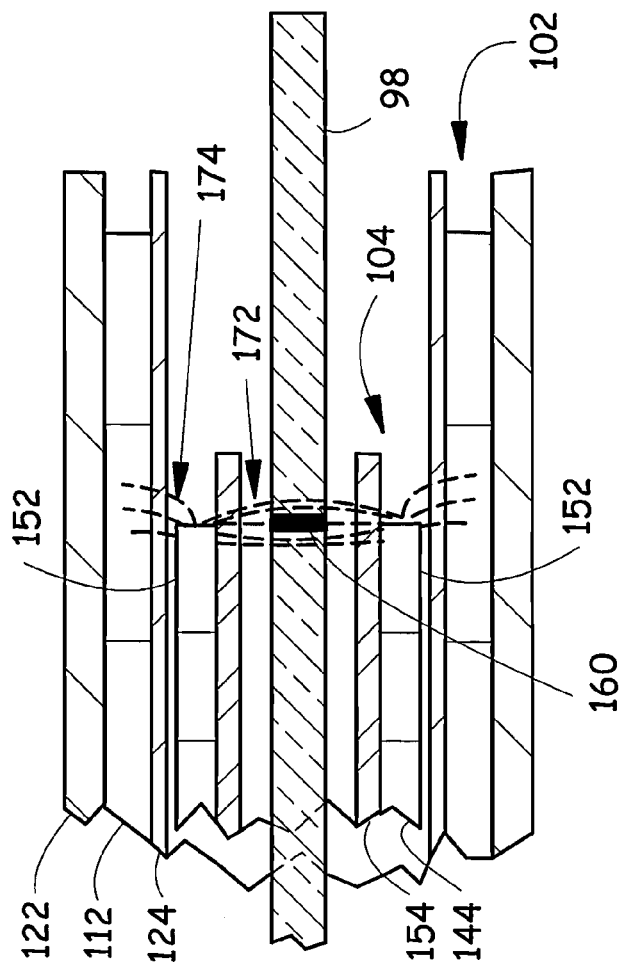
FIG. 3A illustrates a front view of an external magnetic field pattern produced by an end magnet of the slider in FIGS. 1A, 1B.

FIGS. 3A, 3B illustrate portions 172, 174 of an external magnetic field pattern produced by an end magnet 152. FIG. 3A shows a front view comparable to the front view in FIG. 2. FIG. 3B shows a side view that is transverse to the front view in FIG. 3A. The end magnet 152 produces a first magnetic field pattern portion 172 that intersects the region 160 of the magnetostrictive element 98, and magnetizes the region 160 in a transverse direction as illustrated. The end magnet 152 of the slider 104 produces a second magnetic field pattern portion 174 that intersects the coil stack 112 of the stator 102. The second magnetic field pattern portion 174 interacts with the energized stator 102 to produce a motor force between the slider 104 and the stator 102. The motor force moves the slider 104 relative to the stator 102. The end magnet 152 thus provides the dual function of providing a portion of a motor force and also magnetising the region 160. The arrangement of the end magnet 152 usefully avoids a need to provide a separate actuating magnet for the region 160.

The shield tube 154 permits the magnetic field portion 172 to pass through it. The shield tube 154, however, shields the region 160 from the more rapidly changing magnetic fields due to energization of the coil stack 112. The energization of the coil stack 112 produces magnetic fields in an energization frequency range that is higher than an essentially zero frequency of the end magnet 152. In the higher energization frequency range, the shield tube 160 has adequate skin effect to provide attenuation and shielding. For the essentially zero frequency of the end magnet, however, there is no skin effect to attenuate the field of the permanent end magnet 152. The use of the shield tube 154 shields a portion of the magnetostrictive element 98 from the energization field, and reduces jitter in the measured position of the region 160. The measurement of position is more accurate with the use of the shield tube 154. The shield tube 154 provides immunity against the magnetic fields of the motor coil during operation.

Figure 4:
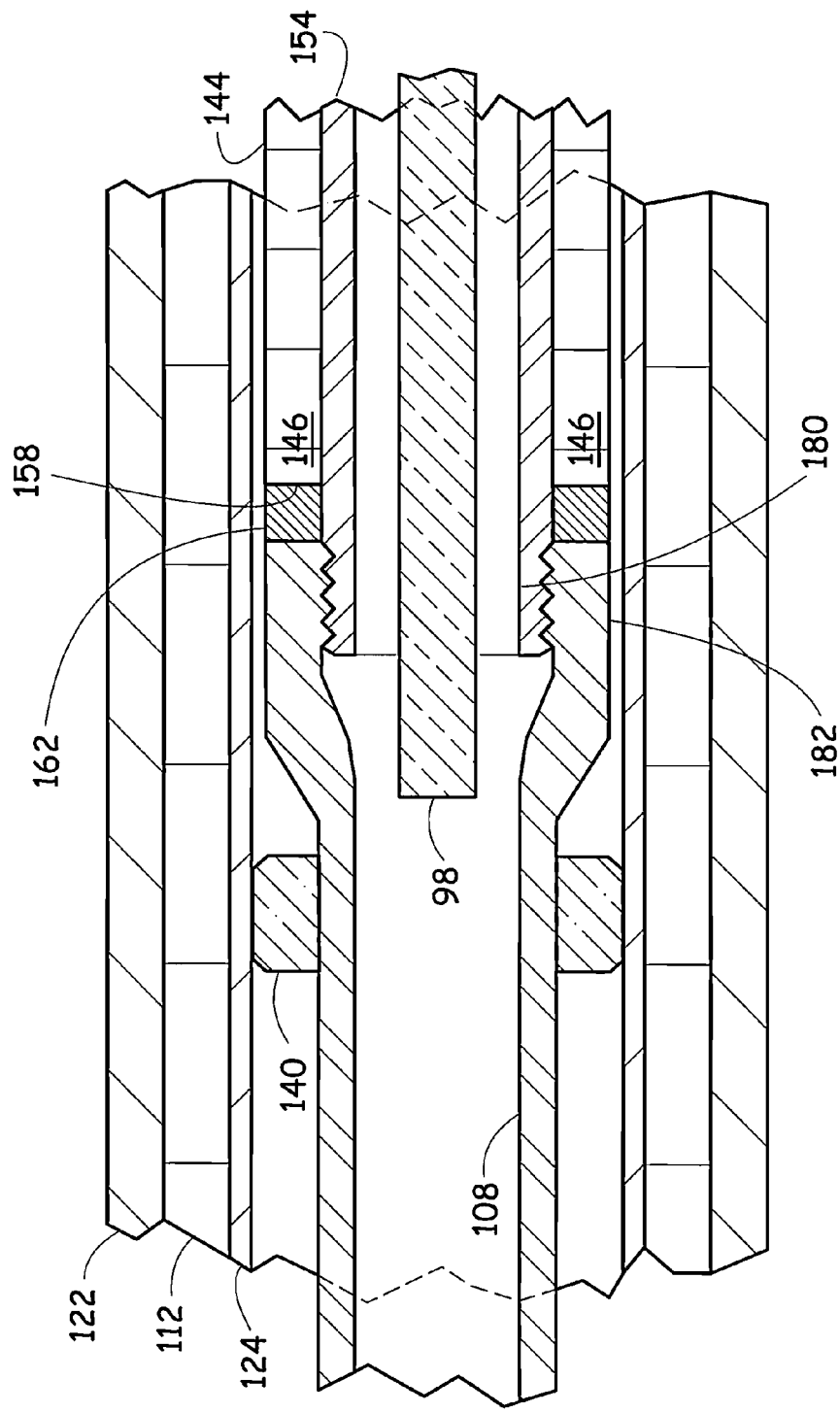
FIG. 4 illustrates an enlarged front view of a flux diverter at a second stack end of the slider in FIGS. 1A, 1B.

FIG. 4 illustrates an enlarged view of the second stack end 158 of the slider 104 of FIGS. 1A, 1B. The second stack end 158 includes an end flux diverter 162 that is adjacent the second stack end 158. The end flux diverter 162 effectively prevents a second stack end magnetic field (FIGS. 5A, 5B) from magnetizing the magnetostrictive element 98. According to one aspect, the end flux diverter 162 is formed of a high permeability soft magnetic material such as mu-metal. According to another aspect, the end flux diverter 162 is annealed in a hydrogen atmosphere to increase relative permeability to over 50,000. According to another aspect, the end flux diverter 162 has a washer shape with a central washer opening through which the magnetostrictive element 98 passes. According to yet another aspect, the end flux diverter 162 is in physical contact with an end magnet 146 at the second stack end 158. The combination of a closed magnetic path through the washer shape, the high relative permeability, and the physical contact between the end flux diverter 162 and the end magnet 246 results in a magnetic circuit that is substantially free of air gaps to provide excellent flux diversion away from the magnetostrictive element 98.

The slider 104 includes a pusher rod 108 that is adjacent to the second stack end 158. The pusher rod 108 is formed from a ferromagnetic steel and is hollow. According to one aspect, the pusher rod 108 is formed of a material with a relative permeability in the range of a few thousand. According to one aspect, the pusher rod 108 includes a threaded end 182 that has internal threads, while the shield tube 154 includes a threaded end 180 that has external threads. The threaded end 182 is threaded onto the threaded end 180 to compress the end flux diverter 162 between the threaded end 182 and the end magnet 146. The compression provides for good physical contact on both sides of the end flux diverter 162 to reduce non-magnetic gaps. The threaded end 180 of the shield tube 154 is formed of non-magnetic material, and it does not divert magnetic flux toward the magnetostrictive element 98. The threaded end 182 is formed of ferromagnetic material so that it diverts flux away from the magnetostrictive element 98. The threaded end 182 serves as an auxiliary or secondary flux diverter.

Figure 5B:
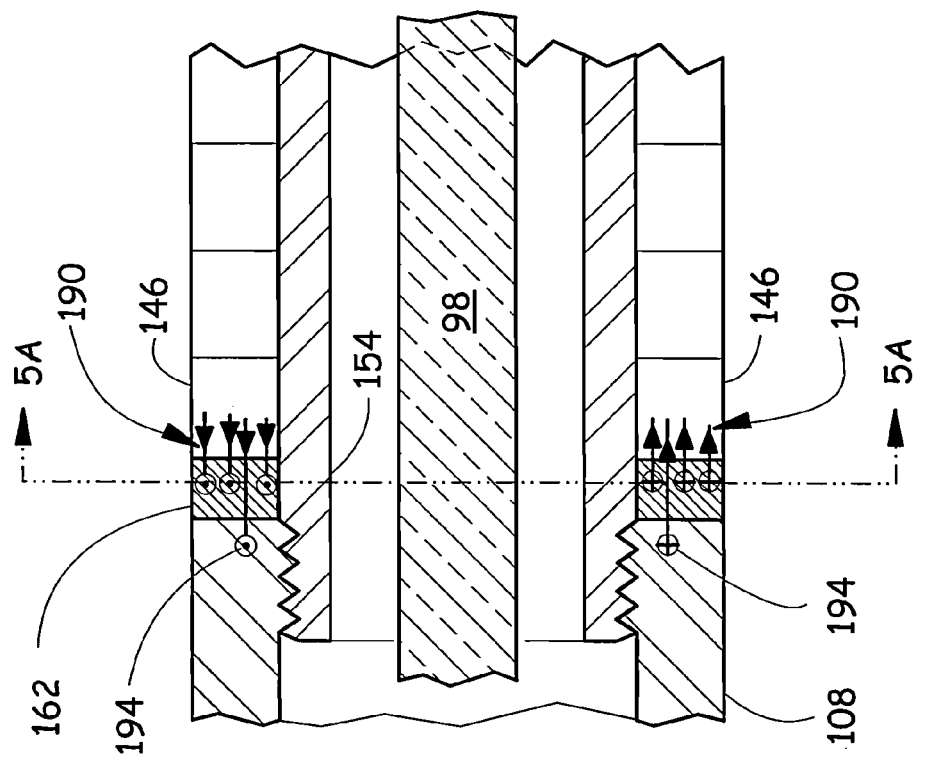
FIGS. 5A and 5B illustrate a magnetic field pattern around the flux diverter in FIGS. 1A, 1B.
Figure 5A:
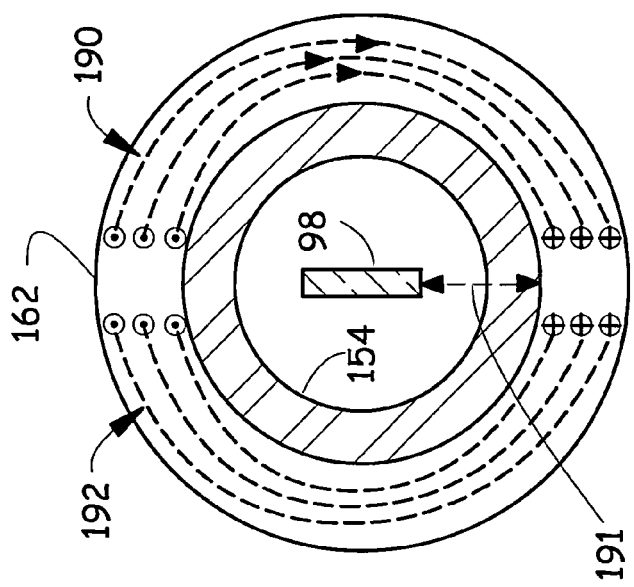

FIGS. 5A, 5B illustrate portions of a magnetic field patterns 190, 192, 194 that are diverted internal to the end flux diverter 162 and the pusher rod 108 of FIG. 4. A first portion of magnetic field flux 190 from the end magnet 146 is diverted by the end flux diverter 162 so that the magnetic field flux 190 passes through the end flux diverter 162 instead of through the magnetostrictive element 98. A second portion of magnetic field flux 192 from the end magnet 146 is diverted by the end flux diverter 162 so that the magnetic field flux 192 passes through the end flux diverter 162 instead of through the magnetostrictive element 98. A smaller third portion of magnetic field flux 194 from the end magnet 146 is diverted by the pusher rod 108 so that the magnetic field flux 194 passes through the pusher rod 108 instead of through the magnetostrictive element 98. The diversion of magnetic flux by the end flux diverter 162 and the pusher rod 108 helps to avoid interference with (i.e., undesired transverse magnetization of) the magnetostrictive element 98.

As illustrated in FIG. 5A, a substantial non-magnetic gap 191 separates the end flux diverter 162 from the magnetostrictivie element 98. The non-magnetic gap 191 comprises air and non-ferromagnetic stainless steel. The non-magnetic gap 191 enhances diversion of flux away from the magnetostrictive element 98. The fact that the threaded end 180 of the non-magnetic shield tube 154 passes through a center hole in the end flux diverter 162 increases the size of the non-magnetic gap 191 and improves flux diversion.

Figure 6:
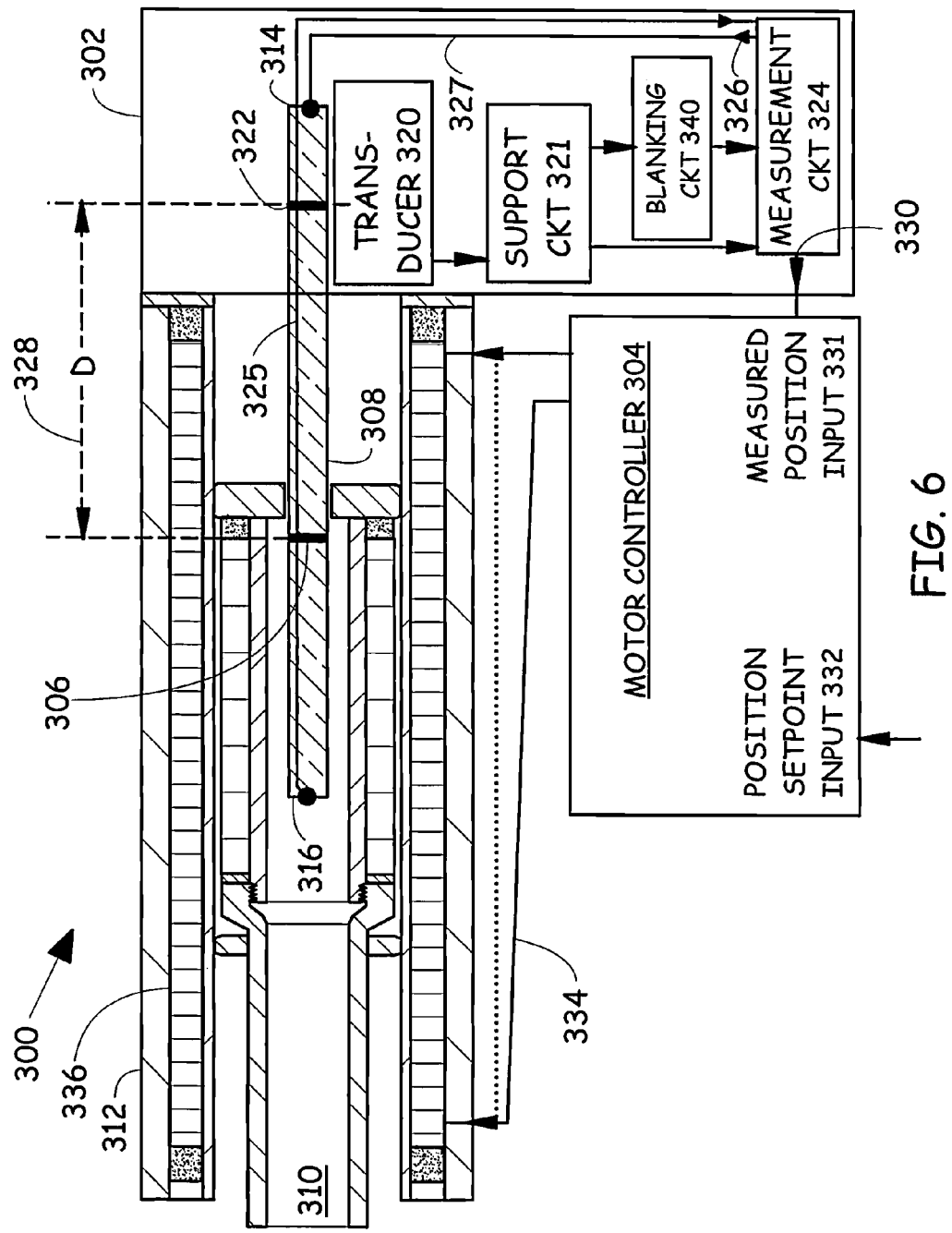
FIG. 6 illustrates a motor coupled to a transducing circuit and a motor controller circuit.

FIG. 6 illustrates a motor 300 (similar to the motor 100 in FIGS. 1A, 1B) coupled to a transducing circuit 302 and a motor controller circuit 304. A region 306 (similar to the region 160 in FIG. 1) moves along a magnetostrictive element 308 as a slider 310 moves relative to a stator 312.

The magnetostrictive element 308 extends from a first element end 314 to a second element end 316. A transducer 320 in the transducing circuit 302 couples to a transducing region 322 of the magnetostrictive element 308. A support circuit 321 supports the operation of the transducer 320. The support circuit 321 receives analog pulses from the transducer 320 and provides corresponding digital pulses to a measurement circuit 324 and a blanking circuit 340. According to one aspect, coupling between the transducing region 322 and the transducer 320 comprises magnetic coupling. The measurement circuit 324 in the transducing circuit 302 is electrically connected by insulated leads 325, 327 to the first element end 314 and the second element end 316. The measurement circuit 324 provides an electrical current pulse 326 that flows along the length of the magnetostrictive element 308. The electrical current pulse 326 magnetizes the magnetostrictive element 308 in a generally circular direction. During the electrical current pulse 326, the magnetization by the electrical current pulse 326 temporarily overcome a transverse magnetization in the region 306. At the end of the current pulse 326, the magnetization direction of the region 306 abruptly changes from circular to transverse. Due to the magnetostrictive effect, the abrupt change in magnetization in the region 306 from circular to transverse produces a sonic pulse that travels from region 306 to the transducing region 322. The magnetostrictive element 308 functions as a sonic waveguide for the sonic pulse. The measure circuit 324 measures a time delay T between an end of the electrical current pulse 326 and an arrival of the sonic pulse at the transducing region 322. The measurement circuit 324 computes a distance D (at 328) between the region 306 and the transducing region 322 according to a formula, distance D equals sonic velocity V times delay T. The sonic velocity V along the magnetostrictive element 308 is a known constant. The measurement circuit 324 provides a measured position output 330 to a measured position input 331 of the motor controller 304. The motor controller 304 receives a position setpoint at an input 332. The motor controller provides drive currents on bus 334 to a stack of coils 336 in the stator. The controller compares the setpoint at input 332 to the measured position output 330 in order to provide closed loop control of the position of the slider 310.

The blanking circuit 340 couples to the support circuit 321 and the measurement circuit 324 and blanks a repetition of the current pulse during a blanking time interval. The blanking time interval is set to ensure that one sonic pulse has dissipated before starting another sonic pulse.

Figure 7:
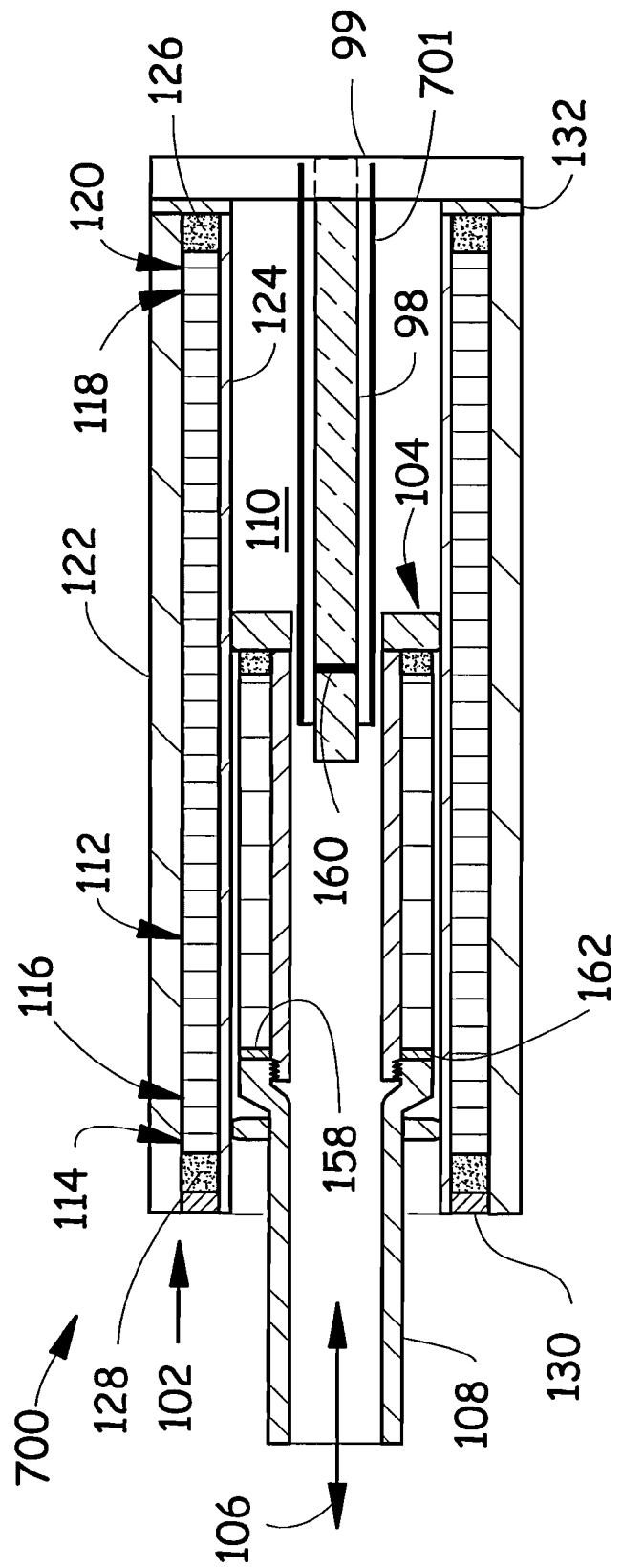
FIG. 7 illustrates a motor that includes a shield tube that is attached to a first stator end.

FIG. 7 illustrates a motor 700 that includes a shield tube 701 that is attached to a first stator end 99. The slider 104 does not have a shield tube 154 (FIG. 1) attached to it. Reference numbers used in FIG. 7 that are the same as reference numbers used in FIGS. 1A, 1B identify the same or similar parts. Attachment of the shield tube 701 to the first stator end 99 avoids adding a moving mass of the shield tube 154 to the slider 104. In other respects, the motors 100, 700 are similar.

Although the present invention has been described with reference to preferred embodiments, workers skilled in the art will recognize that changes may be made in form and detail without departing from the spirit and scope of the invention.

What is claimed is:

1. A motor, comprising:
    a stator that surrounds a stator bore;
    a position-sensing magnetostrictive element that extends along the stator bore; and
    a slider that slides in the stator bore, the slider having an elongated ferromagnetic portion joined to a non-ferromagnetic portion having a stack of motor magnets operable with the stator having a first stack end that has no stack end flux diverter, and the first stack end provides a first stack end magnetic field pattern that magnetizes a region of the magnetostrictive element and that intersects the stator.

2. The motor of claim 1 wherein the slider does not include a position indicating magnet, separate from the stack of motor magnets, for magnetizing the region of the magnetostrictive element.

3. The motor of claim 1 wherein the first stack end is positioned between a second stack end and a sonic pulse sensor that couples to the magnetostrictive element.

4. A motor, comprising:
    a stator that surrounds a stator bore and that produces a changing stator magnetic field in a stator excitation frequency range;
    a position-sensing magnetostrictive element that extends along the stator bore; and a slider that slides in the stator bore, the slider including an elongated ferromagnetic tube joined to a non-ferromagnetic tube that surrounds the magnetostrictive element, and a stack of motor magnets disposed on the non-ferromagnetic tube, the stack comprising a first stack end providing a first stack end magnetic field that magnetizes a region of the magnetostrictive element, the non-ferromagnetic tube shielding the magnetostrictive element from the changing magnetic field in the excitation frequency range.

5. The motor of claim 4 wherein the non-ferromagnetic tube attenuates the changing stator magnetic field inside the tube by at least 3 decibels in the excitation frequency range.

6. The motor of claim 4 wherein the first stack end magnetic field passes through the non-ferromagnetic tube.

7. The motor of claim 4 wherein the non-ferromagnetic tube comprises stainless steel.

8. A motor, comprising:
a stator that surrounds a stator bore;
a position-sensing magnetostrictive element that extends along the stator bore; and
a slider that slides in the stator bore, the slider having an elongated ferromagnetic portion joined to a non-ferromagnetic portion having a stack of motor magnets that includes a first stack end and a second stack end and an end flux diverter adjacent the second stack end, the end flux diverter preventing a second stack end magnetic field from magnetizing the magnetostrictive element.

9. The motor of claim 8 wherein the end flux diverter comprises mu metal.

10. The motor of claim 8 wherein the end flux diverter has a washer shape with a central washer opening through which the magnetostrictive element passes.

11. The motor of claim 8 wherein the end flux diverter is in physical contact with a magnet at the second stack end.

12. The motor of claim 8 wherein the first stack end has no stack end flux diverter.

13. The motor of claim 8 wherein the first stack end has no stack end flux diverter.

14. A position sensing circuit, comprising:
a position-sensing magnetostrictive element mounted at a mounting end of a motor stator, the magnetostrictive element sensing a position along a stator bore;
a slider that slides in the stator bore, the slider having an elongated ferromagnetic portion joined to non-ferromagnetic portion having a stack of motor magnets, the stack comprising a first stack end adjacent the mounting end, the first stack end providing a first stack end magnetic field that magnetizes a region at the position on the magnetostrictive element; and
a position-indicating circuit mounted on the mounting end, the circuit including:
a transducer that transduces a sonic pulse adjacent the mounting end of the magnetostrictive element to an analog pulse;
a transducer circuit that receives the analog pulse and provides a digital pulse;
a measurement circuit that provides a current pulse to the magnetostrictive element and that measures a sonic delay time between the current pulse and the digital pulse; and
a blanking circuit couples to the transducer circuit and that blanks a repetition of the current pulse during a blanking time interval.

* * * * *